W. KIRKWOOD.
GAS GENERATOR.
APPLICATION FILED MAR. 15, 1911.
1,029,692.
Patented June 18, 1912.
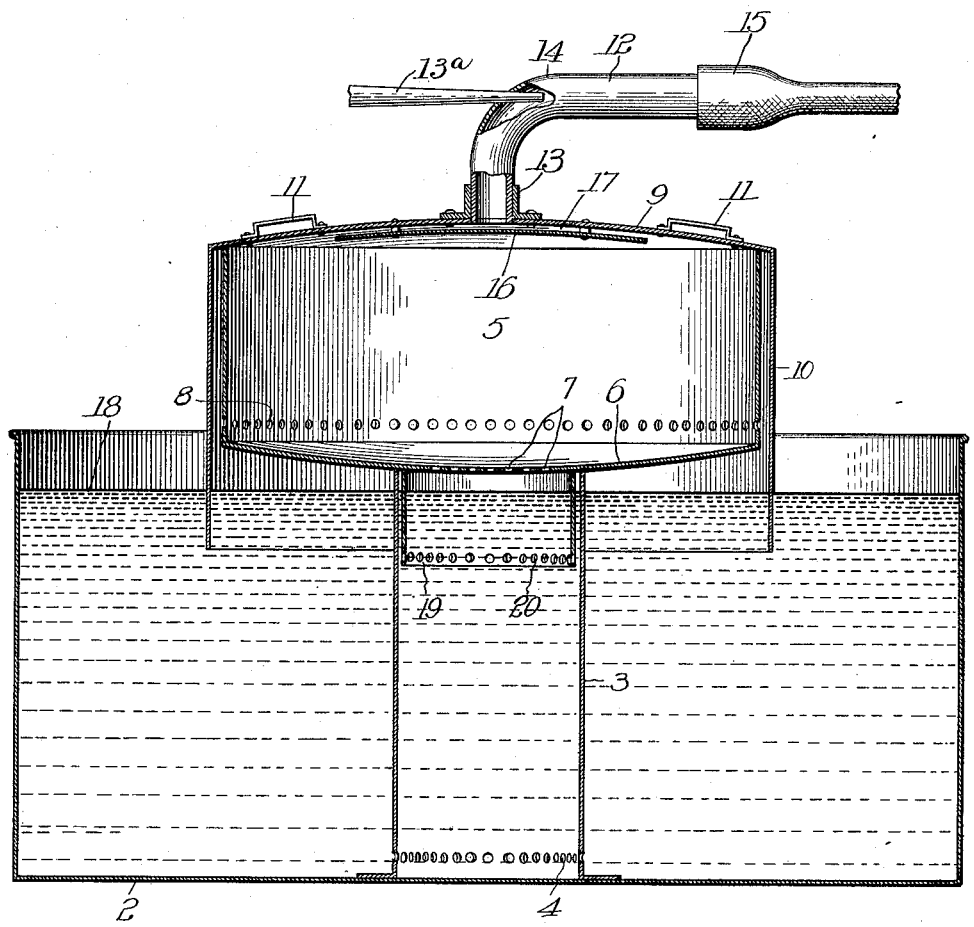
Witnesses:
Robert H. Weir
Leo J. Dumais
Inventor
William Kirkwood
By Jacob Elliott
Atty

UNITED STATES PATENT OFFICE.

WILLIAM KIRKWOOD, OF CHICAGO, ILLINOIS.

GAS-GENERATOR.

1,029,692.	Specification of Letters Patent.	Patented June 18, 1912.

Application filed March 15, 1911. Serial No. 614,624.

*To all whom it may concern:*

Be it known that I, WILLIAM KIRKWOOD, a citizen of the United States, and a resident of Chicago, in the county of Cook and State of Illinois, have invented certain new and useful Improvements in Gas-Generators, of which the following is a full, clear, and exact specification.

This invention relates to improvements in gas generators in which heretofore gas is generated and maintained under pressure from a solid and a liquid material, the reaction of which gives off heat at atmospheric pressure, and increasingly with additional pressure, and by reason of which heat the reaction is incomplete and imperfect to a degree making impossible the production of gas therefrom to the otherwise full capacity of a given amount of these materials, or which in time of production or quality is desirable for the purposes of economy for obtaining the best results for a variety of uses, and especially for that of lead burning for which said gas is commonly used.

On account of their accessibility and cheapness, water acidulated with sulfuric acid and scrap iron are commonly used for producing such gas, notwithstanding that under pressure the heats of reaction substantially reduce the solubility of the iron, as will be understood by bearing in mind that the solubility of sulfate of iron reaches a maximum at a few degrees below 100° C. and rapidly diminshes at that point, becoming *nil* at a point just below 160° C., and that the maximum solubility of sulfate of iron is below 96° C. or that of about four inches of pressure of mercury below atmospheric pressure.

The prime object of this invention, broadly stated, is a gas generator in which it is practical and possible to produce gas from a reaction between acidulated water and iron at a temperature and pressure corresponding with the maximum solubility of sulfate of iron, as above stated.

More specifically stated, the object of my invention is a gas generator in which gas is produced in the presence of an exhaust discharging the gas from the generator as fast as it is formed, and carrying with it the heats of reaction.

A further object of my invention is a means by which the holder for the solids is vertically adjustable in the tank for the liquid with reference to a desirable variance under some conditions of the liquids therein.

Another object of my invention is a construction of a gas generator providing for maximum of access for the receptacle of the solids and the utilization of its bell for closing that receptacle, and as a means of connecting the generator with an exhaust.

A still further object of my invention is a baffle plate so arranged as to prevent liquids discharging into the exhaust pipe and connected with the bell so that it is removable therewith.

With these ends in view, my invention finds embodiment in certain features of novelty in the construction, combination and arrangement of parts by which the said objects and certain other objects are hereinafter attained, all as fully described with reference to the accompanying drawing, and more particularly pointed out in the claims.

In the drawing the figure illustrates, in vertical section, a gas generator in which my invention finds embodiment.

Similar characters of reference indicate the same parts in said drawings.

As intended to be illustrated in the drawing, the several parts, the tank, the receptacle for the solids, its supports, the bell and the baffle plate are circular in cross section, but may be of any other form, and the tank is particularly rectangular in form, for the purpose of sufficient capacity when required by the form of the space it must necessarily occupy.

The tank 2 may be of wood or iron lead lined for resisting the action of its contained acidulated water supplied to the gas producing solid as hereinafter described.

Resting upon the bottom of the tank 2 is a hollow post 3, provided at a point shortly removed above the bottom of the tank with a series of perforations 4, and supporting on its upper end a holder 5, the bottom 6 of which is preferably concave and centrally provided with a series of perforations 7 opposing the adjacent open end of the post 3, and together with a series of perforations 8, through and surrounding the side wall of the holder at a short distance above its bottom 6, provide for a circulation of the liquid through in and out of the holder, acting on the iron solution which increases the specific gravity of the solution. This circulation is produced by reason of the perforations 8 being in a plane above the perforations 7, with the latter in a plane above the perforations 4 and 20, as may be, in their respective posts, and that the liquid acting on the iron produces sulfate of iron solution, increasing the specific gravity of the liquid in the holder over that in the tank, which liquid being in vacuum throughout its circulation is therefore not affected by the vacuum of the holder.

The upper end of the holder 5 is entirely open for free access to the contents thereof in the charging and discharging of the holder with the solid, which in the use of my invention usually consists of scrap iron or spelter, the holder being closed, when in operation, by the cover 9 of a bell, the sides 10 of which extend downwardly below the bottom of the holder, and for convenience of raising it above and lowering it to its operative position is provided with handles 11, 11.

The bell rests upon and is entirely supported by the edges of the holder when in use, the cover 9 being provided with a discharge pipe 12 projecting through and soldered to the cover, as indicated at 13, which pipe may be bent, as indicated at 14, and is connected by a hose 15 with some suitable exhaust (not shown), such for example as an injector, pump, fan or other device for producing a vacuum in the holder in the presence of the materials therein contained, the detachability of the hose from the pipe providing for removing the bell from the holder for cleansing and refilling purposes.

Fixed to the underside of the bell cover 9, and extending across the opening in the cover, is a baffle plate 16 for preventing liquid in the holder ascending through the cover, and at the same time providing for the discharge of the gases into the exhaust pipe through a space 17 between the baffle plate and the cover 9. In the position of these several parts, as they are shown in the drawing, the level 18 of the acidulated water in the tank is normally well toward the top of the tank, and just below the lowest point of the bottom 6 of the holder, and the holder filled well toward its top with pieces of iron (not shown). With the parts in this position, and so filled, an exhaust in the pipe 13 by means of an injector 13ª will result in an exhaust in the holder producing a vacuum therein, pulling acidulated water in the tank through the perforations 4 in the post 3, and lifting it to contact with the contents of the holder, and thereby the reaction between the iron and the acidulated water for producing the volume of gas desired.

It frequently happens that in charging the holder and tank, it is desirable to reduce their contents to a minimum, and for this purpose the post 3 is removable and the bottom of the holder is provided with a collar 19 surrounding its perforation, and welded thereto, which collar is provided with a series of perforations 20. On the removal of the post 3 the holder 5 may then be lowered into the tank and supported above its bottom by the collar 19, which in turn will suspend the lower edge of the bell just above the bottom, which arrangement provides for a minimum charge of acidulated water, the normal level of which will then be just below the bottom of the holder. In this connection it should be observed that it will be no departure from my invention to have differing lengths of posts, whereby as many adjustments of the holder in the tank may be made.

Having described my invention, what I claim and desire to secure by Letters Patent is:—

1. A gas generator comprising in combination a tank for a liquid, a holder, a bell, and a removable hollow perforated support for the holder and bell substantially as described.

2. A gas generator comprising in combination a tank, a holder, and a hollow post supporting said holder from the bottom of the tank being provided with outlets discharging liquid therefrom into the contents of the tank, a series of outlets in the holder surrounded by said post, said holder being further provided with inlets thereto in a plane above the outlets thereof, substantially as described.

3. A gas generator comprising in combination a liquid holding tank, a holder provided with inlets above its bottom for conducting liquid from the tank through the holder in contact with the contents thereof, means for producing a vacuum in the holder, a series of oulets in the bottom of said tank, a hollow post supporting the holder and surrounding the bottom perforations therein, and means for discharging the liquid contents of the post into that of the tank, whereby a continuous circulation of liquid may be maintained in, through and out of the holder in the presence of a vacuum, substantially as described.

4. A gas generator comprising in combination a tank, a holder, means for producing a vacuum therein, a removable hollow post supporting the holder from the bottom of the tank, a collar secured to the holder and telescoping into said post, said collar and post being provided with perforations respectively toward their lower ends, a series of outlets in the holder surrounded and inclosed by the posts and collar, and a series of inlets in the holder above the bottom thereof, whereby a circulation of liquid is maintained continuously in one direction through the holder, the collar and post and the tank in the presence of a vacuum, substantially as described.

5. A gas generator comprising in combination a liquid holding tank, a holder for solids, means for supporting said holder above the normal level of the liquid in the tank, a bell projecting below the level of said liquid and surrounding the holder, the top of which bell forms a cover for the holder, and means connected with the bell whereby a vacuum is produceable in the holder, substantially as described.

6. A gas generator comprising in combination a liquid holding tank, a holder, a removable post supporting the bottom of the holder well toward the top of the tank, a collar projecting from the bottom of the holder and provided with openings in the side walls thereof communicating with openings in the bottom of the holder whereby on the removal of the post the holder may be lowered well toward the bottom of the tank and yet be above the normal level of liquid therein, and a bell inclosing said holder, substantially as described.

7. A gas generator comprising in combination a tank for liquids, a holder for solids supported therein, a bell inclosing said holder and extending below the bottom thereof, a gas discharge opening in said holder, a baffle plate opposing said discharge, and means for producing a vacuum in the holder, substantially as described.

In witness whereof, I have hereunto set my hand and affixed my seal, this 13th day of March, A. D. 1911.

WILLIAM KIRKWOOD. [L. S.]

Witnesses:
JNO. G. ELLIOTT,
F. E. BROM.

---

Copies of this patent may be obtained for five cents each, by addressing the "Commissioner of Patents, Washington, D. C."